United States Patent
Shiu et al.

(10) Patent No.: US 11,503,429 B2
(45) Date of Patent: Nov. 15, 2022

(54) RELATIVE POSITION POSITIONING SYSTEM AND RELATIVE POSITION POSITIONING METHOD THEREOF

(71) Applicant: Gunitech Corp., Qionlin Township, Hsinchu County (TW)

(72) Inventors: Huan-Ruei Shiu, Qionlin Township (TW); Chung-Liang Hsu, Qionlin Township (TW); Xiao-Juan Lin, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 25 days.

(21) Appl. No.: 17/137,744

(22) Filed: Dec. 30, 2020

(65) Prior Publication Data

US 2022/0132268 A1 Apr. 28, 2022

(30) Foreign Application Priority Data

Oct. 27, 2020 (TW) .................................. 109137271

(51) Int. Cl.
*H04W 24/00* (2009.01)
*H04W 4/02* (2018.01)
(52) U.S. Cl.
CPC .................................. *H04W 4/023* (2013.01)
(58) Field of Classification Search
CPC .................................................... H04W 4/023
See application file for complete search history.

(56) References Cited

U.S. PATENT DOCUMENTS

2013/0072219 A1* 3/2013 Zhang ..................... G01S 5/021
455/456.1
2017/0030995 A1* 2/2017 Khong .................. G01S 13/878

FOREIGN PATENT DOCUMENTS

EP 2703832 A2 * 3/2014 .............. G01S 11/02

* cited by examiner

*Primary Examiner* — Erika A Washington
(74) *Attorney, Agent, or Firm* — Alan D. Kamrath; Karin L. Williams; Mayer & Williams PC

(57) ABSTRACT

A relative position positioning system and a relative position positioning method thereof are disclosed. The method includes the following steps: controlling a plurality of receivers to broadcast a plurality of positioning signals; receiving the plurality of positioning signals and then returning a first reply signal; controlling a plurality of first receivers to transmit a first positioning data to a main device to calculate the plurality of distances to the plurality of first receivers, wherein the plurality of first receivers are devices that have received the first reply signal; returning a second reply signal from the device of interest; controlling a second receiver to transmit a second positioning data to the main device, wherein the second receiver belongs to the plurality of first receivers and has received the second reply signal; and calculating a relative position relationship between the main device and the device of interest.

18 Claims, 3 Drawing Sheets

RELATIVE POSITION POSITIONING SYSTEM AND RELATIVE POSITION POSITIONING METHOD THEREOF

BACKGROUND OF INVENTION

1. Field of the Invention

The present invention relates to a relative position positioning system and a relative position positioning method thereof, and more particularly to a relative position positioning system and a relative position positioning method thereof that can quickly locate a position.

2. Description of Related Art

Traditionally, a method for positioning a device often uses the triangulation positioning principle to calculate the position of an object on a map. In the prior art, if the distance between two objects is to be obtained, one still needs to respectively acquire the positioning points of three known positions to obtain a total of six positions and calculate the coordinate values of the two objects, namely the x and y values, in order to further calculate the distance between the two objects. Therefore, the calculation method of the prior art is cumbersome and will take too much time. If one of the objects is moving, the slow calculation process will be unable to detect the position of the object in real time.

Therefore, it is necessary to invent a new relative position positioning system and a new relative position positioning method thereof to solve the shortcoming of the prior technology.

SUMMARY OF THE INVENTION

The main purpose of the present invention is to provide a relative position positioning system that can quickly locate a position.

Another main purpose of the present invention is to provide a relative position positioning method for the above-mentioned system.

In order to achieve the above purpose, the relative position positioning system of the present invention is used in a space, and the space can also include a device of interest. The relative position positioning system comprises a plurality of receivers and a main device. The plurality of receivers are all located in the space, and each receiver comprises a first signal transmission module and a data integration module. The first signal transmission module is used to emit positioning signals. The data integration module is electrically connected to the first signal transmission module. The main device comprises a second signal transmission module and a calculation module. The second signal transmission module is used to receive the positioning signal and return a first reply signal, wherein the data integration module generates the first positioning data according to the first reply signal. The calculation module is electrically connected to the second signal transmission module. When the plurality of first receivers receives the first reply signal, the first signal transmission module of the plurality of first receivers transmits the first positioning data to the second signal transmission module so that the calculation module can calculate the plurality of distances to the plurality of first receivers, and when the device of interest is located in the space, the device of interest receives the plurality of positioning signals and returns a second reply signal; the first signal transmission module of the second receiver having received the second reply signal then transmits the second positioning data to the second signal transmission module, wherein the second receiver belongs to the plurality of first receivers; thereby, the calculation module then calculates the relative position relationship between the main device and the device of interest based on the second positioning data.

The relative position positioning method of the present invention is used in a relative position positioning system to acquire the relative position relationship between the main device and the device of interest in the space. The space also includes a plurality of receivers. The method includes the following steps: controlling a plurality of receivers to broadcast a plurality of positioning signals; making the main device receive the plurality of positioning signals and then return the first reply signal; controlling the plurality of first receivers to transmit the first positioning data to the main device so that the main device can calculate the plurality of distances to the plurality of first receivers, wherein the plurality of first receivers has received the first reply signal; after the device of interest receives the plurality of positioning signals, returning the second reply signal; controlling the second receiver to transmit the second positioning data to the main device, wherein the second receiver belongs to the plurality of first receivers and has received the second reply signal; and then calculating the relative position relationship between the main device and the device of interest based on the second positioning data.

DETAILED DESCRIPTION OF THE INVENTION

In order to allow the reviewers to better understand the technical content of the present invention, a preferred specific embodiment is described as follows.

Figure 1:
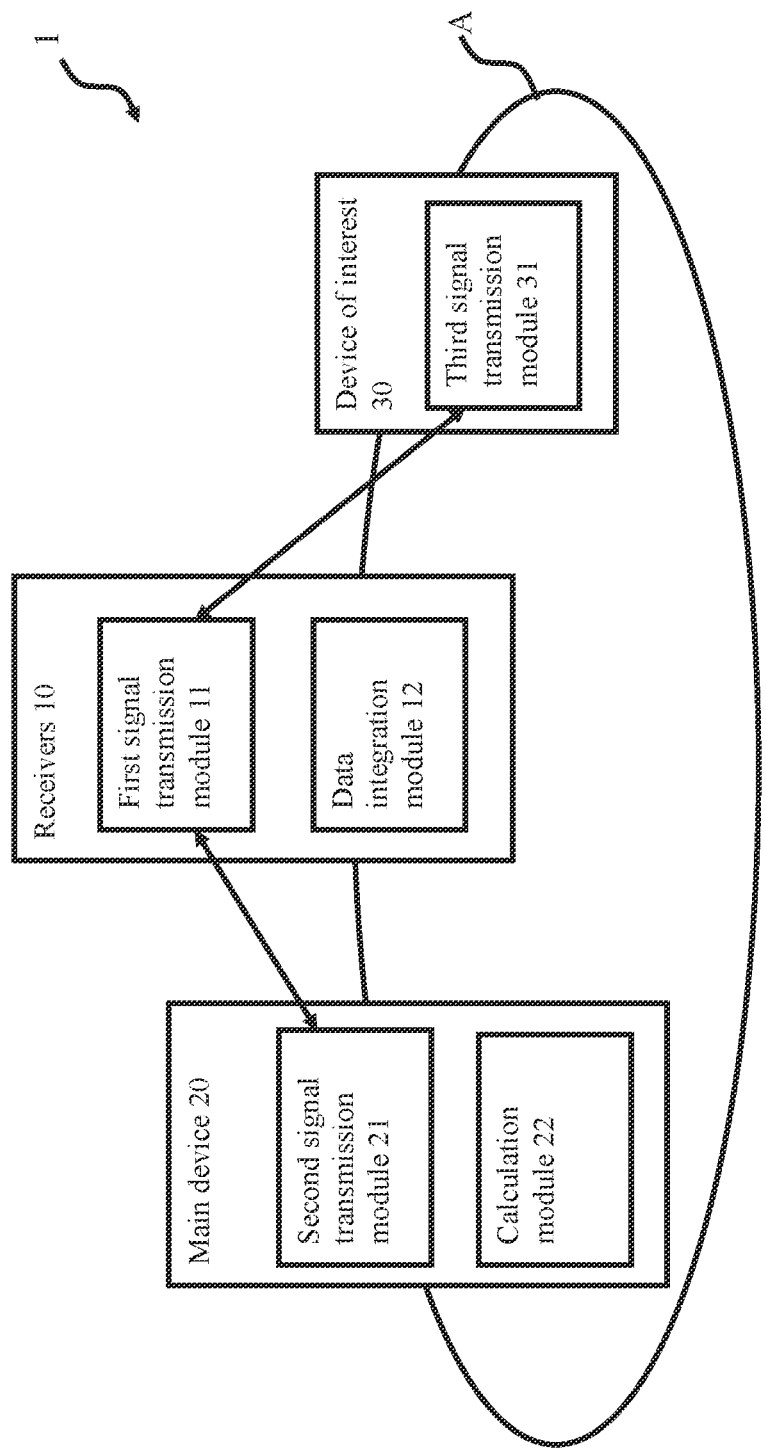
FIG. 1 is a system architecture diagram of the relative position positioning system of the present invention.

Please refer to FIG. 1, which is a system architecture diagram of the relative position positioning system of the present invention.

In one embodiment of the invention, the relative position positioning system 1 is applied in a space A. The space A can be a space indoors or outdoors, but the present invention is not limited thereto. The relative position positioning system 1 comprises a plurality of receivers 10 and a main device 20, and the main device 20 uses the plurality of receivers 10 to obtain the relative position of the device of interest 30 in the space A. The receiver 10, the main device 20 and the device of interest 30 can all transmit wireless signals, such as the signals conforming to Bluetooth mesh or low-power Bluetooth beacon standards, but the invention is not limited to this type of signal. The plurality of receivers 10 are all located in the space A, and the position coordinates of the plurality of receivers 10 are all known. The receiver 10 can be any computer system, base station, home appliance or piece of furniture, but the invention is not limited to these types. Each receiver 10 comprises a first signal transmission module 11 and a data integration module 12. The first signal transmission module 11 is used to continuously broadcast the positioning signals to the outside. The positioning signal can be transmitted to the main device 20 or to the device of interest 30, and the first signal transmission module 11 can also receive the return signal from the main device 20 or from the device of interest 30. The data integration module 12 is electrically connected to the first signal transmission module 11 to integrate the signals received by the first signal transmission module 11.

The main device 20 can be a smart phone or a smart wearable device, but the present invention is not limited thereto. The main device 20 comprises a second signal transmission module 21 and a calculation module 22. The second signal transmission module 21 is used to receive a plurality of positioning signals and then to return the first reply signal to the receiver 10. The data integration module 12 of the receiver 10 generates a first positioning data according to the first reply signal. The above-mentioned positioning signal and the first reply signal may be an identification code, a power level or a wireless received signal strength (RSSI) of the receiver 10 and the main device 20, so the first positioning data generated by the data integration module 12 can include an identification code, a power level or a wireless received signal strength of the receiver and the main device at the same time, and the first signal transmission module 11 then returns the first positioning data to the main device 20. The receiver 10 can adjust the accuracy by adjusting the power level. When the decibel value of the power level increases, a stronger signal strength can be obtained such that the calculation result can be more accurate. The calculation module 22 is electrically connected to the second signal transmission module 21, and the calculation module 22 can calculate the distance to the receiver 10 according to the first positioning data transmitted by the receiver 10. When the plurality of first positioning data are received, the calculation module 22 can respectively calculate the distance between the main device 20 and the plurality of receivers. In this way, as long as the distances to the three receivers are known, the calculation module 22 can use the triangulation positioning principle to calculate the coordinates of the main device 20 on the map. Since the triangulation positioning principle is well known by those with ordinary knowledge in the technical field of the present invention, its principle is not described here.

The device of interest 30 can also be a smart phone or a smart wearable device, can be placed on pets, children or other moving objects, and also has a third signal transmission module 31 for transmitting signals. When the device of interest 30 enters the space A, the third signal transmission module 31 of the device of interest 30 also returns a second reply signal to the receiver 10 after receiving the plurality of positioning signals. At this time, the data integration module 12 of the receiver 10 having received the second reply signal generates a second positioning data according to the second reply signal. The second positioning data may also include an identification code, a power level or a wireless received signal strength of the receiver 10 and the device of interest 30. The first signal transmission module 11 then transmits the second positioning data to the second signal transmission module 21 of the main device 20 such that the calculation module 22 can calculate the relative position relationship of the main device 20 and the device of interest 30.

It should be noted that the calculation module 22 can use the first positioning data and the second positioning data to calculate the two straight-line distances from the main device 20 to the receiver 10 and from the device of interest 30 to the receiver 10, and then use the receiver 10 located in the same orientation as the device of interest 30 to calculate the approximate included angle. With these two straight lines and an included angle, the distance and angle from the main device 20 to the device of interest 30 can be known to obtain the relative positions of the two devices.

It should be noted that each module of the receiver 10, the main device 20 and the device of interest 30 can be constructed of a hardware device, a software program combined with a hardware device, and a firmware combined with a hardware device. For example, a computer program can be stored in a computer readable medium to read and execute various functions of the invention, but the present invention is not limited to the above modes. In addition, this embodiment only exemplifies a preferred embodiment of the present invention and does not describe all possible variations and combinations in detail to avoid repetition. However, those skilled in the art should understand that not all the above modules or components are necessary. In order to implement the present invention, other more detailed conventional modules or components may also be included. Each module or component may be omitted or modified as required, and other modules or components may be present between any two modules.

Figure 2:
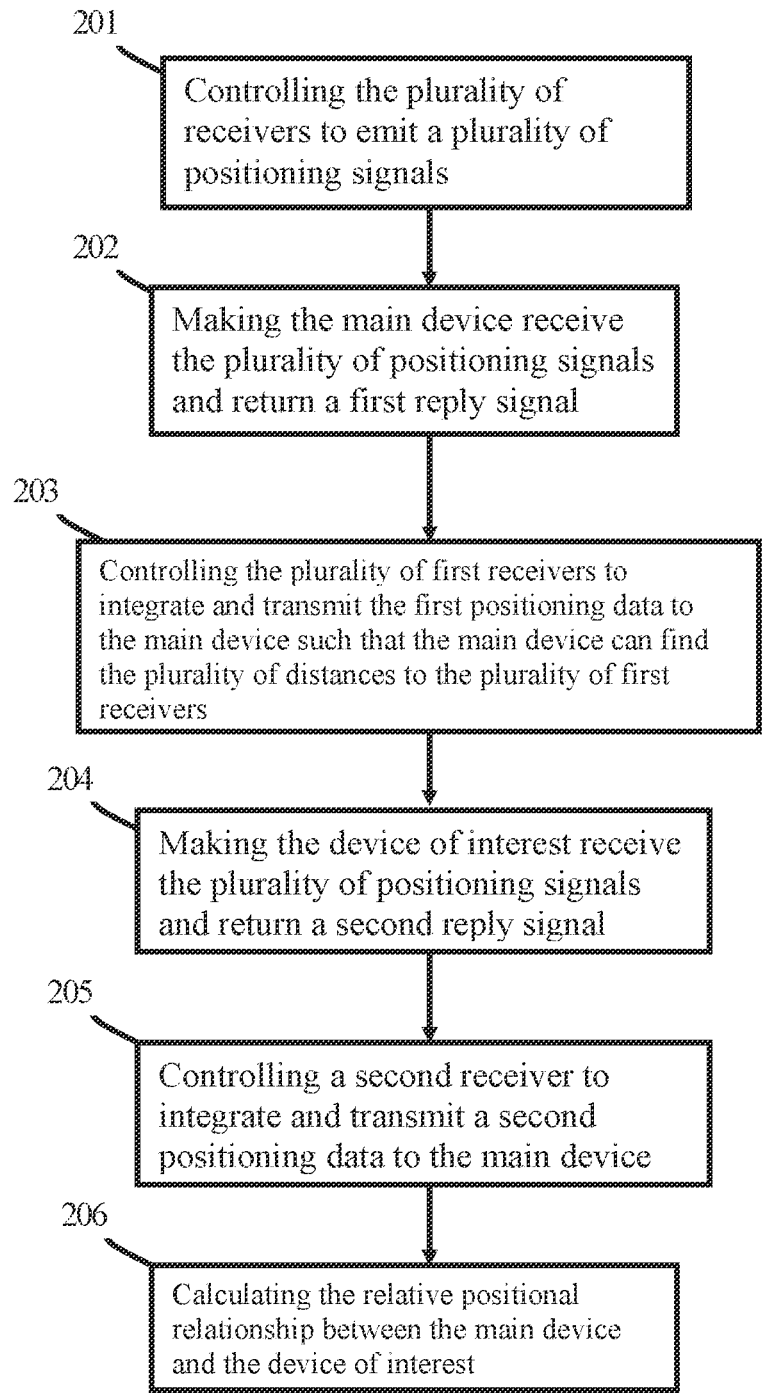
FIG. 2 is a flowchart of the steps of the relative position positioning method of the present invention.
Figure 3:
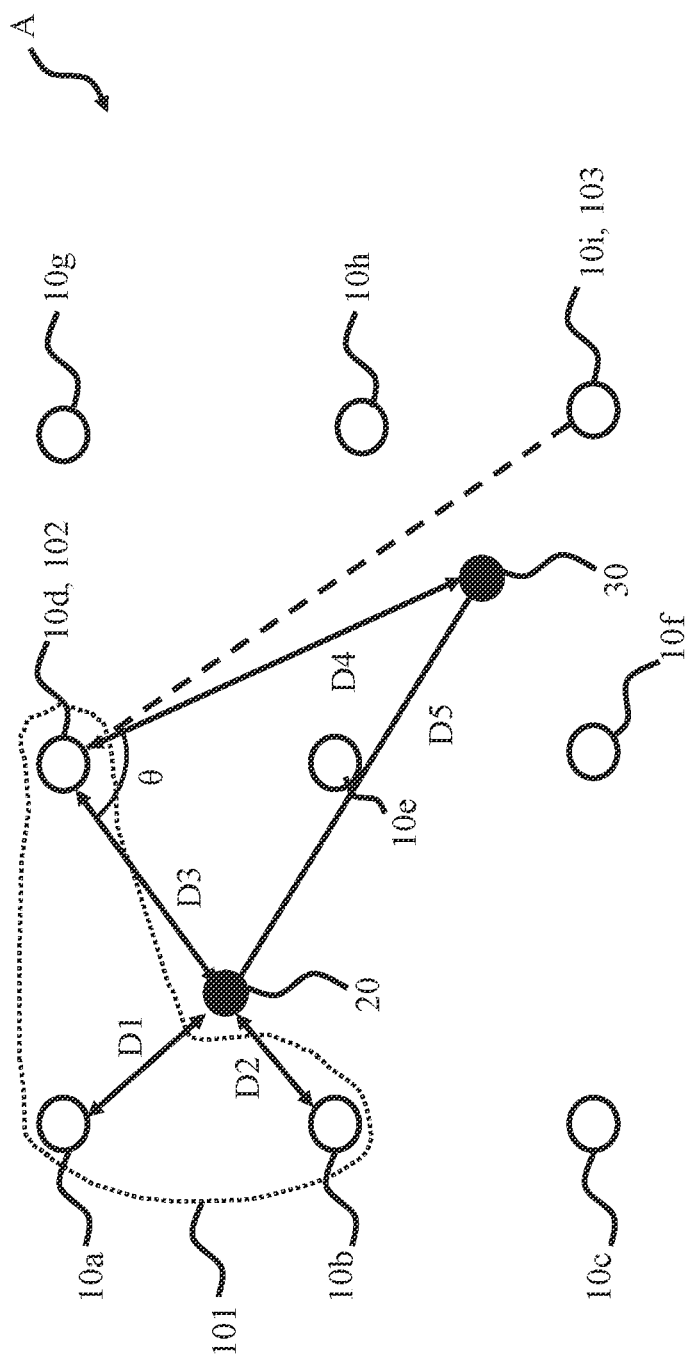
FIG. 3 is a schematic diagram of the relative positions of the main device, the device of interest and the plurality of receivers of the present invention.

For the detailed method to acquire the relative position of the device of interest 30, please refer to FIG. 2, which is a flowchart of the steps of the relative position positioning method of the present invention, and to FIG. 3, which is a schematic diagram of the relative positions of the main device, the device of interest and the plurality of receivers of the present invention. It should be noted here that although the relative position positioning system 1 described above is employed as an example to illustrate the relative position positioning method of the present invention, the relative position positioning method of the present invention is not limited to a relative position positioning system 1 using the same structure as described above.

It should also be noted that the plurality of receivers 10 is divided into a plurality of first receivers 101, a second receiver 102, and a third receiver 103 according to different uses. The plurality of first receivers 101 is a plurality of devices that transmit the first positioning data to the main device 20 for the calculation module 22 to perform distance calculation. The second receiver 102 is a device that transmits second positioning data to the main device 20 for the calculation module 22 to perform distance calculation, and the second receiver 102 must belong to one of the plurality of first receivers 101. The third receiver 103 is a device for the calculation module 22 to perform angle calculation.

Taking the diagram shown in FIG. 3 as an example, the relative position positioning system 1 may include 9 receivers 10a-10i, but the present invention is not limited to this number. The arrangement of the receivers 10a-10i is not limited to the diagram shown in FIG. 3. Therefore, the method first proceeds to step 201: controlling the plurality of receivers to emit a plurality of positioning signals.

First, the receivers 10a-10i will broadcast the positioning signals at any time.

Next, the method proceeds to step 202: making the main device receive the plurality of positioning signals and return a first reply signal.

At this time, the second signal transmission module 21 of the main device 20 may receive the plurality of positioning signals and return a first reply signal. Therefore, the second signal transmission module 21 of the main device 20 may receive the positioning signals from the receivers 10a, 10b and 10d, which are closer to one another, and then send the first reply signal to the receivers 10a, 10b, and 10d.

Next, the method proceeds to step 203: controlling the plurality of first receivers to integrate and transmit the first positioning data to the main device such that the main device can find the plurality of distances to the plurality of first receivers.

Then the plurality of first receivers 101 receiving the first reply signal, that is, the data integration modules 12 of the receivers 10a, 10b, and 10d, will each integrate the first positioning data, and the first signal transmission module 11 will then transmit the first positioning data to the main device 20. In this way, the calculation module 22 of the main device 20 can use the triangulation positioning principle to calculate the distances D1, D2, and D3 between the main device 20 and the receivers 10a, 10b, and 10d to further obtain the coordinates of the main device 20.

Then the method proceeds to step 204: making the device of interest receive the plurality of positioning signals and return a second reply signal.

When the device of interest 30 enters the space A, the third signal transmission module 31 of the device of interest 30 may also receive at least one of the positioning signals of the receivers 10a-10i, so the third signal transmission module 31 of the device of interest 30 will return a second reply signal.

Next, the method proceeds to step 205: controlling a second receiver to integrate and transmit a second positioning data to the main device.

Depending on the distance, not every receiver 10a-10i will receive a second reply signal. The data integration module 12 of the second receiver 102 receiving the second reply signal will integrate the second positioning data according to the second reply signal and the positioning signal of the second receiver 102 and then transmit the second positioning data to the main device 20 through the first signal transmission module 11. The second receiver 102 must also be a device in the plurality of first receivers 101, so in this embodiment, the second receiver 102 is the receiver 10d.

Finally, the method proceeds to step 206: calculating the relative positional relationship between the main device and the device of interest.

Finally, the calculation module 22 of the main device 20 will calculate the distance D4 between the device of interest 30 and the receiver 10d based on the second positioning data, and taking the second receiver 102 as a reference, the third receiver 103 located in the same orientation as the device of interest 30 will be used to find the included angle θ. That is, from the perspective of the receiver 10d, the receiver 10i and the device of interest 30 are located in the same orientation, so the third receiver 103 in this embodiment is the receiver 10i. The calculation module 22 of the main device 20 can calculate the included angle θ based on the position, distance and slope of the receiver 10d relative to the receiver 10i. Since the slope of the line connecting the receiver 10d and the receiver 10i is closer to the slope of the line connecting the receiver 10d and the device of interest 30, the approximate length and slope of the distance D5 between the main device 20 and the device of interest 30 can be calculated based on the included angle θ and the distance D3 and D4, by which the relative position between the main device 20 and the device of interest 30 can be obtained.

It should be noted here that the relative position positioning method of the present invention is not limited to the above-mentioned sequence of steps. As long as the purpose of the present invention can be achieved, the above-mentioned sequence of steps can also be changed.

With the relative position positioning method and the relative position positioning system 1 in this invention, the approximate position of the device of interest 30 in a specific space A can be quickly acquired without being limited by the network Wi-Fi, and the precise coordinates of the device of interest 30 need not be calculated tediously.

In summary, in terms of purpose, means and effect of the present invention, this invention is quite different from the conventional technology. However, it should be noted that many of the above-mentioned embodiments are merely examples for the sake of illustration, and the scope of rights claimed in the present invention should be subject to the scope of the listed claims, rather than being limited to the above-mentioned embodiments.

What is claimed is:

1. A relative position positioning method is used in a relative position positioning system to acquire a relative position relationship between a main device and a device of interest in a space, and space also including a plurality of receivers, the method including the following steps:

controlling a plurality of receivers to broadcast a plurality of positioning signals;

making the main device receive the plurality of positioning signals and then return a first reply signal;

controlling a plurality of first receivers to integrate and transmit a first positioning data to the main device such that the main device can calculate a plurality of distances to the plurality of first receivers, wherein the plurality of first receivers are devices that have received the first reply signal;

after the device of interest receives the plurality of positioning signals, returning a second reply signal;

controlling a second receiver to integrate and transmit a second positioning data to the main device, wherein the second receiver belongs to the plurality of first receivers and has received the second reply signal; and calculating the relative position relationship between the main device and the device of interest based on the second positioning data.

2. The relative position positioning method as claimed in claim 1, further including the following steps:

acquiring an included angle and two straight-line distances from the main device to the second receiver and from the device of interest to the second receiver such that the main device can obtain the relative position relationship of the device of interest.

3. The relative position positioning method as claimed in claim 2, further including the following steps:

using a third receiver to calculate the included angle in advance, wherein the third receiver is in the same orientation as the device of interest.

4. The relative position positioning method defined in claim 3, further including the step of finding three receivers as the plurality of first receivers.

5. The relative position positioning method as claimed in claim 2, further including the step of finding three receivers as the plurality of first receivers.

6. The relative position positioning method as claimed in claim 1, further including the step of finding three receivers as the plurality of first receivers.

7. The relative position positioning method as claimed in claim 1, further including the following steps:

integrating a plurality of positioning signals of the plurality of first receivers and the first reply signal as the first positioning data, and integrating a positioning signal of the second receiver and the second reply signal as the second positioning data.

8. The relative position positioning method as claimed in claim 7, wherein the step of integrating the first positioning data or the second positioning data further includes integrating an identification code, a power level or a wireless received signal strength (RSSI) of the main device, the device of interest or the plurality of receivers as the first positioning data or the second positioning data.

9. The relative position positioning method as claimed in claim 8, further including the step of adjusting the power level to adjust an accuracy.

10. A relative position positioning system used in a space, and space also having a device of interest, the relative position positioning system comprising:
a plurality of receivers located in the space, each of which comprises:
a first signal transmission module for broadcasting a positioning signal; and
a data integration module electrically connected to the first signal transmission module; and
a main device, comprising:
a second signal transmission module for receiving the positioning signal and returning a first reply signal, wherein the data integration module generates a first positioning data according to the first reply signal; and
a calculation module electrically connected to the second signal transmission module;
wherein when a plurality of first receivers receive the first reply signal, the first signal transmission module of the plurality of first receivers transmits a first positioning data to the second signal transmission module to enable the calculation module to calculate a plurality of distances to the plurality of first receivers, and when the device of interest is located in the space, the device of interest receives a plurality of positioning signals and returns a second reply signal; the first signal transmission module of a second receiver that has received the second reply signal then transmits a second positioning data to the second signal transmission module, wherein the second receiver belongs to the plurality of first receivers, whereby the calculation module calculates a relative position relationship between the main device and the device of interest based on the second positioning data.

11. The relative position positioning system as claimed in claim 10, wherein the calculation module is used to calculate an included angle and two straight-line distances from the main device to the second receiver and from the device of interest to the second receiver such that the main device can obtain the relative position relationship of the device of interest.

12. The relative position positioning system as claimed in claim 11, wherein the calculation module uses a third receiver to calculate the included angle in advance, wherein the third receiver is in the same orientation as the device of interest.

13. The relative position positioning system as claimed in claim 12, wherein the calculation module is used to find three receivers as the plurality of first receivers.

14. The relative position positioning system as claimed in claim 11, wherein the calculation module is used to find three receivers as the plurality of first receivers.

15. The relative position positioning system as claimed in claim 10, wherein the calculation module is used to find three receivers as the plurality of first receivers.

16. The relative position positioning system as claimed in claim 10, wherein a data integration module of the plurality of first receivers integrates a plurality of positioning signals of the plurality of first receivers and the first reply signal as the first positioning data, and a data integration module of the second receiver integrates a positioning signal of the second receiver and the second reply signal as the second positioning data.

17. The relative position positioning system as claimed in claim 16, wherein the first positioning data or the second positioning data includes an identification code, a power level or a wireless received signal strength (RSSI) of the main device, the device of interest or the plurality of receivers.

18. The relative position positioning system as claimed in claim 17, wherein the plurality of receivers adjusts an accuracy by adjusting the power level.

* * * * *